US005260576A

United States Patent [19]

Sommer, Jr. et al.

[11] Patent Number: 5,260,576

[45] Date of Patent: Nov. 9, 1993

[54] METHOD AND APPARATUS FOR THE SEPARATION OF MATERIALS USING PENETRATING ELECTROMAGNETIC RADIATION

[75] Inventors: Edward J. Sommer, Jr.; James R. Peatman, both of Nashville, Tenn.

[73] Assignee: National Recovery Technologies, Inc., Nashville, Tenn.

[21] Appl. No.: 605,993

[22] Filed: Oct. 29, 1990

[51] Int. Cl.[5] ........................ G01N 21/00; B07C 5/342

[52] U.S. Cl. ................................ 250/359.1; 250/349; 250/358.1; 250/341; 209/522; 209/524; 209/577; 209/589; 356/432; 378/54

[58] Field of Search .................. 250/359.1, 358.1, 341, 250/349; 378/58, 54, 51; 209/576, 577, 578, 579, 588, 589, 522, 524; 356/432

[56] References Cited

U.S. PATENT DOCUMENTS

| | | | |
|---|---|---|---|
| 3,435,950 | 4/1969 | Suverkrop | 378/51 |
| 3,545,610 | 12/1970 | Kelly et al. | 209/579 |
| 3,655,964 | 4/1972 | Slight | 378/51 |
| 3,939,983 | 2/1976 | Asfour | 356/432 |
| 3,980,180 | 9/1976 | Jamieson | 356/432 |
| 4,212,397 | 7/1980 | Bockelmann | 209/589 |
| 4,262,806 | 4/1981 | Drabs | 209/577 |
| 4,623,997 | 11/1986 | Tulpule | 370/85 |
| 4,884,386 | 12/1989 | Carlo | 53/438 |
| 5,101,101 | 3/1992 | Sawamura | 250/223 R |
| 5,134,291 | 7/1992 | Ruhl, Jr. et al. | 250/341 |
| 5,206,699 | 4/1993 | Stewart et al. | 250/458.1 |

FOREIGN PATENT DOCUMENTS

| | | |
|---|---|---|
| 0291959 | 11/1988 | European Pat. Off. . |
| 325558 | 1/1989 | European Pat. Off. . |
| 353457 | 6/1989 | European Pat. Off. . |
| 2198242 | 6/1988 | United Kingdom . |

OTHER PUBLICATIONS

Patent Abstracts of Japan, vol. 13, No. 590 (P-984), Dec. 26, 1989; & JP-A-1 253 017 (NEC), Sep. 10, 1989.

Patent Abstracts of Japan, vol. 14, No. 538 (P-1136), Nov. 28, 1990; & JP-A-2 228 742 (MEC), Nov. 9, 1990.

Patent Abstracts of Japan, vol. 13, No. 361 (P-917), Aug. 11, 1989; & JP-A-1 119 838 (MEC), Nov. 5, 1989.

*Primary Examiner*—Carolyn E. Fields
*Assistant Examiner*—Drew A. Dunn
*Attorney, Agent, or Firm*—Foley & Lardner

[57] ABSTRACT

A method and apparatus for distinguishing and separating material items having different levels of absorption of penetrating electromagnetic radiation by utilizing a source of radiation for irradiating an irradiation zone extending transversely of a feed path over which the material items are fed or passed. The irradiation zone includes a plurality of transversely spaced radiation detectors for receiving the radiation beams from the radiation source. The material items passing through the irradiation zone between the radiation source and the detectors measures one or more of the transmitted beams in each item passing through the irradiation zone to produce processing signals which are analyzed by signal analyzers to produce actuated signals for actuating a separator device in order to discharge the irradiated items toward different locations depending upon the level of radiation absorption in each of the items. One example of material items which have been successfully separated are recyclable plastic containers, such as polyester containers and polyvinyl chloride (PVC) containers.

29 Claims, 5 Drawing Sheets

METHOD AND APPARATUS FOR THE SEPARATION OF MATERIALS USING PENETRATING ELECTROMAGNETIC RADIATION

This invention was made with Government support under Contract No. 68D80025, having an effective date of Aug. 18, 1988, awarded by the Environmental Protection agency. The Government has certain rights in the invention.

BACKGROUND OF THE INVENTION

The disclosed invention classifies materials by utilizing the tendency of penetrating electromagnetic radiation to pass through differing materials with differing levels of attenuation within the materials according to their chemical properties and provides for separation of the differing materials from each other according to the amount of radiation passing through them. More specifically penetrating electromagnetic radiation is used to simultaneously scan multiple material items as they pass through a region of radiation. Analysis of the measured radiation passed through differing portions of the body of each item is used to classify each item and activate means for separation of items from each other which have differing chemical properties.

It is well known that for materials having similar thicknesses, those materials comprised of elements having a lesser atomic number generally allow a greater degree of penetrating electromagnetic radiation to pass through them than do those materials comprised of elements having a greater atomic number. Additionally, it is also well known that for materials having similar chemical properties those materials of lesser thickness generally allow a greater degree of penetrating electromagnetic radiation to pass through them than do those materials of greater thickness. Therefore materials of differing chemical properties can be selected according to the amount of penetrating electromagnetic radiation passing through them if differences in thicknesses of the materials have relatively less effect on the transmission of penetrating electromagnetic radiation through them than do differences in chemistry.

In the recycling of waste or secondary materials it is very useful to be able to separate mixtures of materials into usable fractions each having similar chemical properties. For instance it is useful to separate plastic materials from glass materials, to separate metals from nonmetals, to separate differing plastics from each other, and to separate dense materials from less dense materials. There are many other such useful separations practiced in industry using many different methods which are too numerous to enumerate herein.

It has been found that in separating mixtures of materials for recycling, the disclosed invention is very effective at distinguishing and separating items of differing chemical composition. Mixtures containing metals, plastics, textiles, paper, and/or other such waste materials can be separated since penetrating electromagnetic radiation typically passes through the items of different materials to differing degrees. Such mixtures occur frequently in the municipal solid waste recycling industry and in the secondary metals recycling industries. An example is the separation of aluminum beverage cans from mixtures containing such cans and plastic containers, such mixtures being commonplace in curbside recycling programs. Another example is the separation of chlorinated plastics (a source of corrosive gasses when burned) from a municipal solid waste mixture to provide a less polluting fuel for municipal waste incineration.

It has also been found that the invention is useful for separating chlorinated plastics from mixtures containing non-chlorinated plastics since it has been found that chlorinated plastics typically allow less transmission of penetrating electromagnetic radiation than do nonchlorinated plastics. Such separation renders these plastics each more valuable for recycling. Such mixtures of plastics are commonplace in municipal waste recycling programs. Until now such separations have been performed using methods which are cumbersome and slow, thereby limiting their usefulness. For instance in the U.S., the manufacturers of plastic containers for consumables have recently begun molding a numerical identification code into the base of the containers which indicates their chemical composition such as polyolefins, polyesters, or vinyls (polychlorinated plastics). Using these codes the plastics can be manually hand-sorted from each other. However, this method is slow, labor intensive, and expensive and has not found widespread use for these reasons.

There exist three known processes for automated separation of chlorinated plastics from mixtures of plastics according to their response to electromagnetic radiation. One of these processes is disclosed in European patent application No. 88107970.1 of Giovanni, filed May 18, 1988, and published on Nov. 23, 1988. Another process is disclosed in U.S. Pat. No. 4 884 386 issued to Gulmini Carlo on Dec. 5, 1989. The third process is known as the Rutgers process.

Each process requires that items in the mixture be placed singly into a radiation chamber, following which placement measurements are made to classify the plastic item according to its response to an electromagnetic radiation beam, and subsequent direction to the plastic item to a destination according to its chemical composition. After this sequence is completed, another plastic item is fed into the radiation region and the sequence is repeated. This requirement for operation with single items makes necessary elaborate equipment for singly selecting items from the mixture and placing them one at a time into these separators. Furthermore, since the plastics are required to be singly classified one after another, the methods are limited in throughput due to the finite time required to execute the sequence for each item.

Typical plastic containers for consumables are manufactured with thicker walls at the neck and base than in their central portions. Such plastic containers when flattened for storage or shipping reasons during recycling typically contain folds incurred during the flattening process. Necks, caps, bases and folds give rise to significant variations in total material thickness presented to a penetrating electromagnetic radiation beam. It has been found by the inventors that utilizing measures of radiation transmission through the neck, cap, base, or a folded region of a plastic container can give inaccurate results in attempting to classify the chemical composition of the container due to these variations in total material thickness.

SUMMARY OF THE INVENTION

It has been found that the disclosed invention surmounts the above mentioned limitations and provides efficient high volume separations by allowing plastic materials to be fed multiply and in a continuous manner without regard to orientation into a common region of penetrating electromagnetic radiation. Simultaneous measurements are made on all items as they move through the region of radiation so to distinguish and classify each plastic item according to its chemical properties and thicknesses. The items are then simultaneously directed to different destinations according to their chemical properties and thicknesses. As a result of this capability of operation with multiple items the disclosed invention operates at a significantly greater throughput rate than the aforementioned processes and requires no specialized means for singly placing materials into the radiation region.

We have found that, in practice, taking a measurement through only a relatively thin cross section of an item requires detailed knowledge of the geometry and orientation of the item (such as a container). Accordingly, placement of an item between a radiation source and a radiation detector such that radiation passing through only a relatively thin cross section is measured requires sophisticated and expensive materials handling means. However, our invention overcomes this limitation. We have found that use of high speed electronic signal processing circuitry to analyze a group of separate measurements taken through differing portions of the body of an item to be classified as it passes between the radiation source and radiation detector allows selection of only those measurements of greater transmission rate for use in classifying the item. Therefore specialized placement and orientation of the item between the source and detector is not required.

Accordingly it has been found that the method of the disclosed invention of acquiring multiple separate measurements of radiation transmitted through different portions of the body of an item to be classified and using high speed signal processing circuitry to identify and use only those measurements of highest transmission rate through the item to classify the item overcomes uncertainties in classification arising from variations in total thickness of the item. It is noted that with our invention other signal processing algorithms which correlate the separate measurements taken on an item could also be used such as, for example, averaging the measurements or averaging the selected measurements.

The disclosed invention employs an improved method for distinguishing, classifying and separating mixtures of material items which comprises:

(a) conveying the items multiply and in a continuous manner through a radiation region or zone of penetrating electromagnetic radiation, (b) irradiating the multiple items simultaneously with penetrating electromagnetic radiation as the items pass through the radiation region, (c) simultaneously acquiring for the multiple items a group of separate measurements for each item, each measurements of a group being a measurement of the amount of penetrating electromagnetic radiation passing through a different portion of the body of an item, and (d) simultaneously directing the multiple items each to a destination determined by analysis of the group of measurements of the amount of transmission of penetrating electromagnetic radiation passing through each item.

BRIEF DESCRIPTION OF THE DRAWINGS

FIG. 4-B is a graphic illustration similar to FIG. 4-A illustrating a crushed PVC (polyvinyl chloride) container, and a graph illustrating corresponding measurements of transmitted radiation along the container.

DESCRIPTION OF THE PREFERRED EMBODIMENTS

Figure 1:
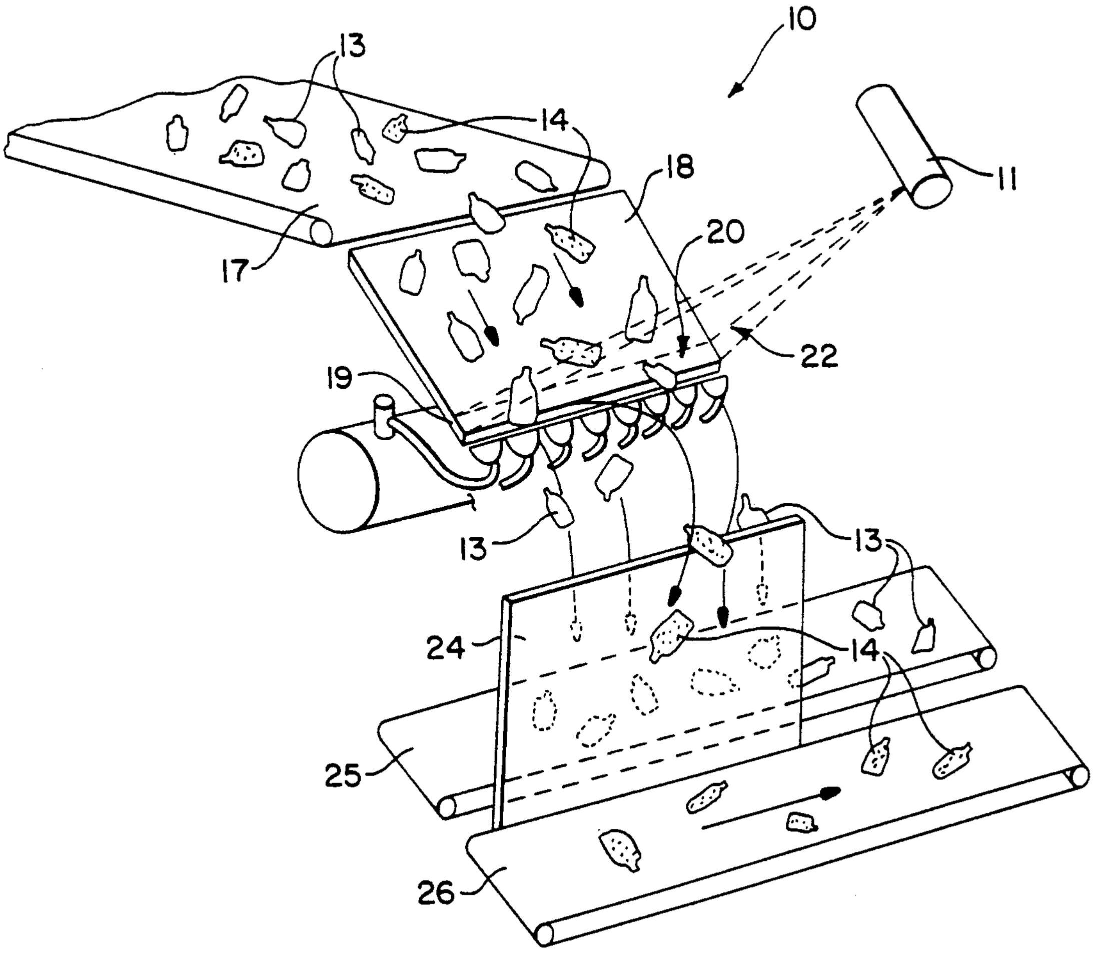
FIG. 1 is a front perspective view of the apparatus for the separation of materials using penetrating electromagnetic radiation, made in accordance with this invention, in which two sets of material items are being processed and separated.
Figure 2:
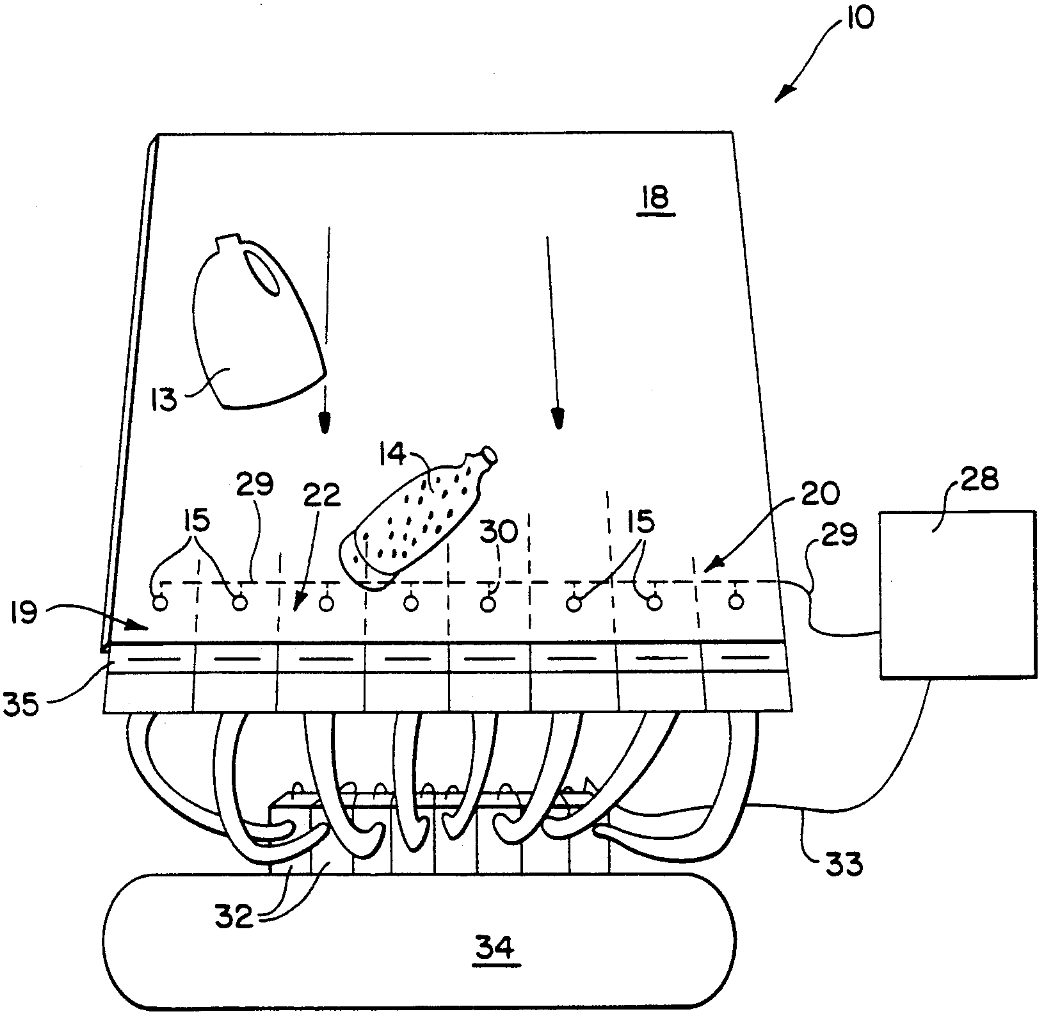
FIG. 2 is an enlarged front elevation of the apparatus disclosed in FIG. 1, illustrating a single item of the first set and a single item of the second set being moved over the slide conveyor.
Figure 3:
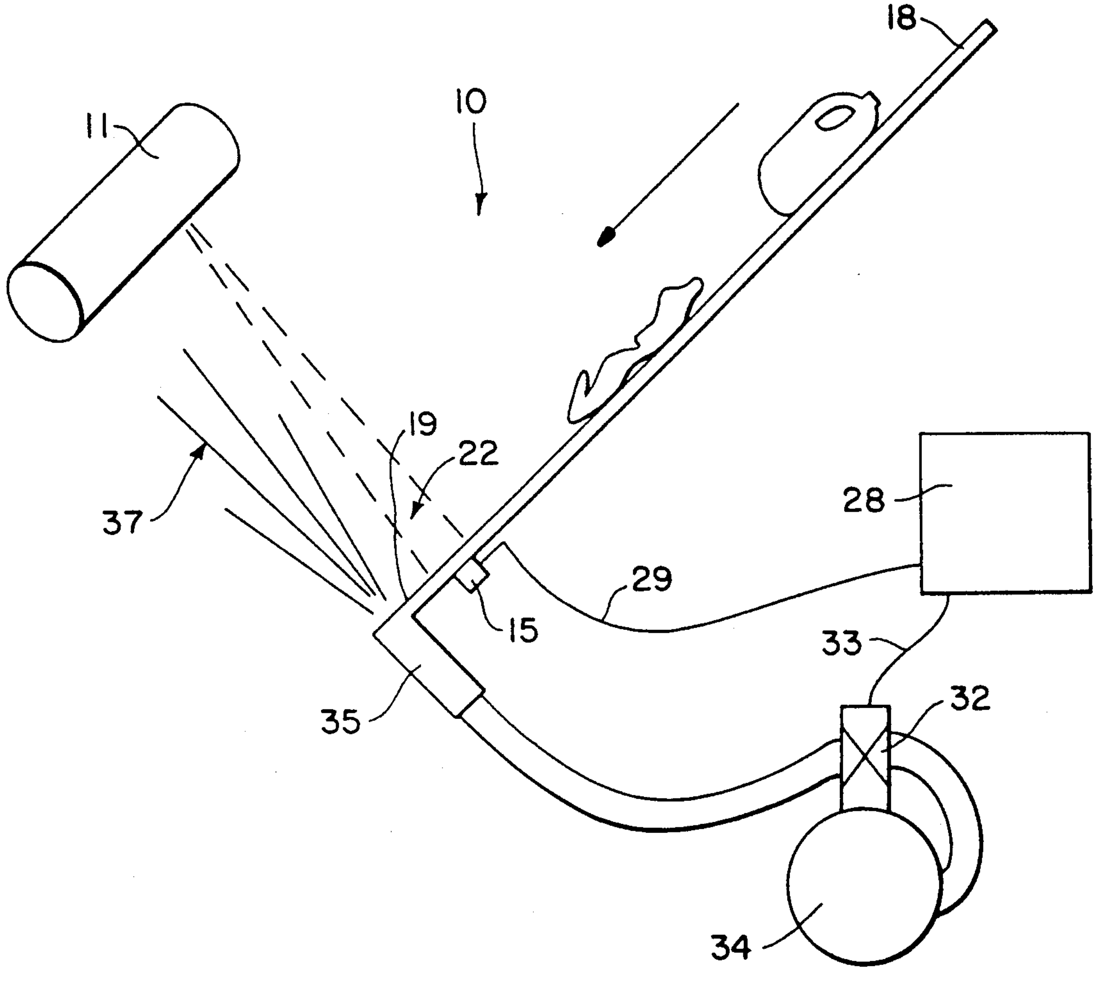
FIG. 3 is a side elevation of the apparatus disclosed in FIG. 2, illustrating one uncrushed item of one set and one crushed item of a second set of the material items moving over the slide conveyor.

In the disclosed apparatus 10 in FIGS. 1-3, the source of penetrating electromagnetic radiation may be either an x-ray source, a microwave source, a radioactive substance which emits gamma rays, or any other source of electromagnetic radiation, such as the x-ray tube 11, whose rays penetrate through a class of materials to be separated from a mixture of materials. Such sources may also include sources of ultraviolet energy, infrared energy or visible light. The preferred wavelength of radiation to be used depends upon the physical and chemical properties of the items 13 and 14 to be separated since the amount of transmission through the items is dependent upon these factors. It is preferred to use wavelengths which result in transmissions of 10% to 90% of incident radiation passing through the items 13 and 14 to be separated although other wavelengths could be used. Radiation detectors 15 used should be selected to be optimumly sensitive to the radiation wavelengths used. The detectors should be of high speed response, preferably with a response time of one millisec or less to allow for accuracy of measurement with high throughput rates of items to be separated.

FIG. 1 is an illustration of the apparatus 10 in operation. A mixture of two types of materials 13 and 14 to be separated are delivered to the apparatus 10 via a feed conveyor 17. This conveyor 17 is selected so as to deliver the mixture of materials 13 and 14 in uniform fashion across the width of an acceleration slide 18. The acceleration slide 18 is positioned at a declining angle to the horizontal such that the mixture of items 13 and 14 upon it will move down the slide 18 under the influence of gravitational force, preferably accelerating to increasing speeds as the items 13 and 14 progress down the slide 18 causing the items to spread during their descent. At the lower end portion 19 (FIG. 2) of the slide 18 is an array 20 of radiation detectors 15 positioned so that they span the width of the slide 18. The detectors 15 are spaced apart so that any item 13 or 14 in the mixture to be separated cannot pass over the array 20 without passing over at least one detector 15.

Positioned above the detector array 20, as illustrated in FIG. 1, is a collimated source 11 of penetrating electromagnetic radiation which delivers a sheet-like beam of radiation which falls incident upon the width of the acceleration slide 18 in an area strip or radiation zone 22 containing the radiation detector array 20, such that as items 13 and 14 of the mixture pass through this beam, they pass between the radiation source 11 and the detector array 20. Spaced downstream from the lower end 19 of the acceleration slide 18 is a splitter 24 for segregating separated materials 13 and 14 which then fall onto conveyors 25 and 26 placed on the two opposite sides of the splitter 24 for conveyance away from the apparatus 10 to remote discharge areas, not shown.

Each detector 15 in the array 20 is connected to an electronic signal processing circuitry 28 as depicted in FIGS. 2 and 3, through leads 29 and branch leads 30. The circuitry 28 is connected to an electromagnetic air valve 32 through lead 33. The air valve 32 connects a reservoir 34 of compressed gas or air to an air nozzle 35 located directly downstream from each corresponding detector 15. Each detector 15 in combination with its associated circuitry is capable of operating independently of any other detector 15 together with its corresponding circuitry. Each air valve 32 and air nozzle 35 combination is capable of operating independently of any other air valve 32 and its corresponding air nozzle 35. In the apparatus 10 shown in FIG. 3, each detector 15 and its associated circuitry is connected to a single air valve 32 and combination air nozzle 35, although in practice one or more adjacent detectors 15 and its associated circuitry may be connected to one or more air valves 35 in order to feed one or more air nozzles 35 which span the width of the corresponding adjacent detector 15.

Figure 5:
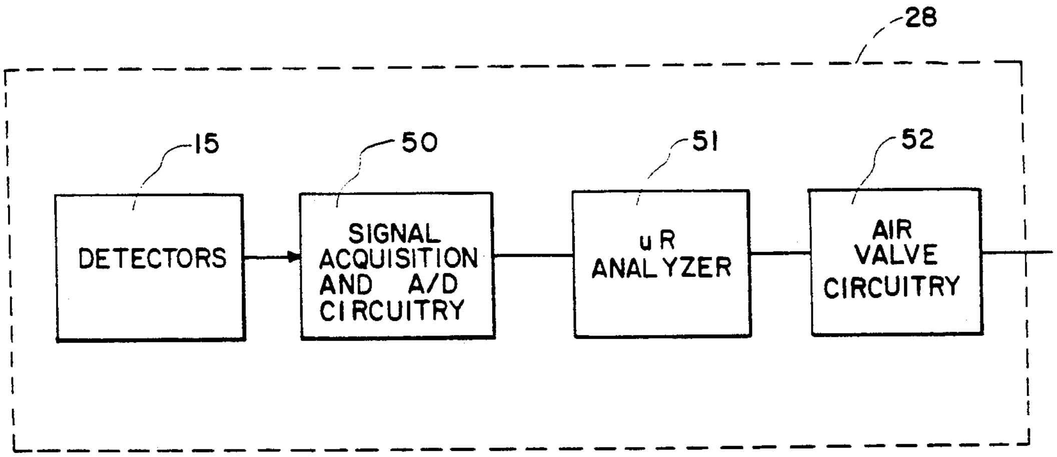
FIG. 5 is a block circuit diagram of the electronic signal processing circuitry.

In FIG. 5, signals are picked up by the detectors 15 and transmitted to the signal acquisition, analog, and digital conversion circuitry 50. These signals are then transmitted to a microprocessor analyzer 51 to identify the region of least thickness in the materials treated. The analyzer 51 then determines if that signal meets the criteria for the material to be selected and energizes the air valve circuitry 52 to either activate the air valve 32 or not.

As a material item 13 or 14 to be separated passes over the detector array 20 it passes between the radiation source 11 and one or more detectors 15. Each detector 15 takes multiple measurements of the intensity of radiation passing through differing portions of the body of the item 13 or 14 as it passes over the detectors 15. These measurements are analyzed by the electronic signal processing circuitry 28 connected to each detector 15, applying a selection algorithm, not shown, to identify the item as being of Type A or Type B, such as 13 or 14. If, in the case depicted, the item is identified as 13, no action is taken and the item 13 falls off the end of the slide 18 and onto the Type A item conveyor 25. If the item is identified as 14 or Type B, then the corresponding air valve 32 or air valves are activated at the appropriate time to cause an air blast 37 (FIG. 3) to be emitted from the appropriate air nozzles 35, so as to eject the item 14 away from the end of the slide 18 and over the splitter 24 so that the item 14 falls onto the Type B item conveyor 20.

As many items 13 or 14 as there are air nozzles 35 can be separated simultaneously in this manner. In the apparatus 10 depicted, up to eight items can be separated simultaneously, since eight nozzles 35 are illustrated in the drawings. We have found that each detector 15, circuitry 28, air valve 32, and air nozzle 35 combination currently used can operate upon as many as ten items per second. Thus, the illustrated embodiment of the apparatus 10 is capable of classifying up to eighty containers per second.

Figure 4A:
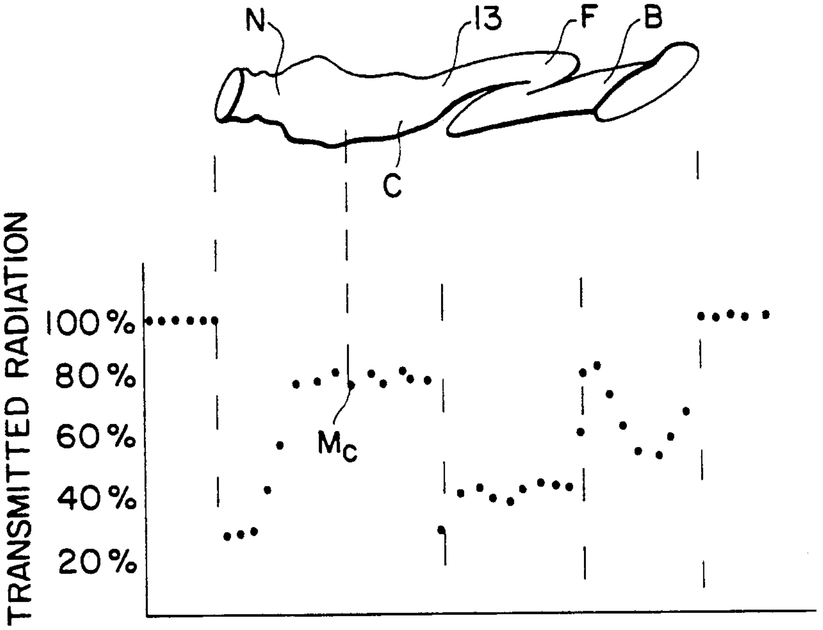
FIG. 4-A is a graphic illustration of a crushed polyester plastic container, typical of a first set of material items to be classified, and a graph illustrating the transmitted radiation measurements at various longitudinal portions of the container.
Figure 4B:
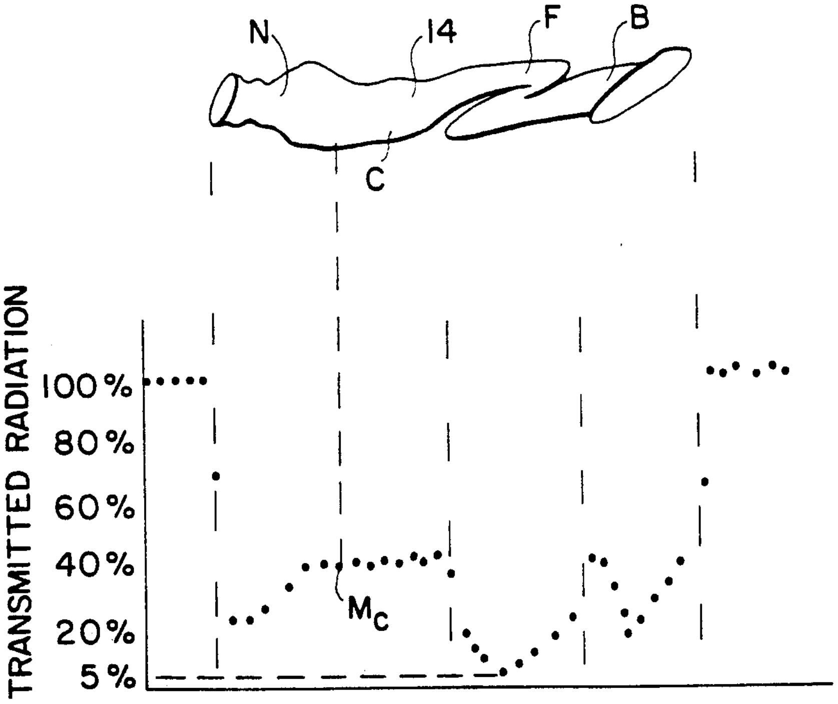

FIG. 4-A depicts a typical flattened polyester plastic container 13 (Type A) which has a neck N, central portion C., and base B, and which contains a fold F caused by the flattening process. A typical graph of measurements of incident penetrating electromagnetic radiation transmitted through corresponding portions of the container are shown below the container 13 and positioned such that a measurement of transmitted radiation shown at a point along the graph corresponds to the portion of the container directly above the graph. (For example, measurement Mc is vertically below a point on central portion C.) It can be seen from the graph that in this example, radiation transmission rates of from 20% to 80% can be measured depending upon which portion of the container the transmission is being measured through. Similarly from the graph of FIG. 4-B of a typical PVC plastic container of similar geometry it can be seen that measurements of transmission rate of from 5% to 40% can be obtained.

A problem arises if a threshold comparator (such as disclosed in Giovanni) is used in an attempt to distinguish between the polyester and PVC containers. In order to reliably distinguish the PVC container 14 in the example of FIG. 4-B, a classification threshold of no less than 40% would risk failure to recognize the container as PVC if the measurement used was taken through a relatively thin cross section such as through an unfolded central portion of the container (which can easily occur if the container passes the radiation detector in an orientation such that the detector does not see a neck, cap, base, or fold). However, using a threshold comparator with the above mentioned 40% classification threshold or greater for PVC when examining a polyester container 13 as in FIG. 4-A may cause the polyester container 13 to be misclassified as PVC if the container passes the detector in an orientation such that the detector sees a neck, cap, base, or fold since some of these measurements show a transmission rate of less than 40% which would trip the threshold comparator by its nature of operation.

Because of possible misclassifications arising from these types of signal overlap we have determined that in general the most reliable measurements for making a classification are those measurements taken through those portions of the body of an item to be classified which exhibit the greatest rates of transmission of radiation through the item (such as those taken through a relatively thin cross section such as through an unfolded central portion of the container).

What is claimed is:

1. A method of distinguishing and separating material items having different levels of absorption of penetrating electromagnetic radiation, comprising steps of:

(a) conveying a plurality of said material items in a random manner simultaneously and longitudinally along an elongated feed path;

(b) establishing a transverse region across said feed path irradiated by a sheet of penetrating electromagnetic radiation;

(c) irradiating said plurality of material items in said transverse region with said penetrating electromagnetic radiation;

(d) simultaneously measuring the amount of penetrating electromagnetic radiation passing through each material item in said transverse region at any instant of time as said items are continuously conveyed longitudinally through said transverse region, to generate process signals; wherein more than one process signal is generated for each of said material items, each process signal being commensurate with the amount of penetrating electromagnetic radiation passing through a portion of each material item which is different from any other portion of said material item, and selecting for processing those of said process signals which do not pass through irregularities in the bodies of said material items; and (e) simultaneously analyzing said process signals to cause said process signals to actuate means for directing said items to a different destination commensurate with the amount of said penetrating electromagnetic radiation passing through each of said corresponding material items.

2. The method according to claim 1 in which said irradiating step irradiates at least two material items simultaneously in said transverse region.

3. The method according to claim 1 in which said conveying step continuously conveys said plurality of said material items through said transverse region in said random manner.

4. The method according to claim 1 in which each of said material items conveyed through said transverse region has a random orientation and random placement relative to any other of said material items.

5. The method according to claim 1 in which the shape of each material item conveyed may be different from the shape of any of said other material items conveyed through said transverse region.

6. The method according to claim 1 in which said material items comprise municipal solid waste materials.

7. The method according to claim 1 wherein said penetrating electromagnetic radiation has a wavelength within a range of wavelengths from gamma radiation through microwave radiation.

8. The method recited in claim 1 wherein said penetrating electromagnetic radiation has a wavelength resulting in transmission through said material items of between about 10% and about 90% of said penetrating electromagnetic radiation incident on the material items.

9. The method recited in claim 1, further comprising taking multiple measurements through different portions of the body of each said material item and analyzing said multiple measurements to identify and ignore regions of irregularity within the body of each said material item, and classifying each said material item using selected ones of said multiple measurements.

10. The method recited in claim 1, wherein said transfer region across said feed path is irradiated by a single source of penetrating electromagnetic radiation.

11. An apparatus for distinguishing and separating material items having different levels of absorption of penetrating electromagnetic radiation, comprising:

(a) a pathway comprising means for conveying a plurality of material items randomly in a longitudinal feed direction from a trailing portion to a leading portion, the transverse dimension of said pathway being greater than the combined transverse dimensions of at least two of said material items, (b) an irradiation zone extending transversely over said leading portion of said pathway, and having a predetermined transverse dimension, (c) irradiating means spaced from said irradiation zone for continuously transmitting penetrating electromagnetic radiation into said irradiation zone in a sheet like pathway throughout said predetermined transverse dimension and through any of said material items conveyed through said irradiation zone, (d) a plurality of radiation detectors spaced transversely across said pathway for receiving radiation from said irradiation zone after said radiation has been transmitted through said material items in said irradiation zone, (e) signal analyzer means in electrical communication with each of said detectors for converting said radiation into electronic process signals, each process signal being commensurate with the amount of penetrating electromagnetic radiation passing through a portion of each material item which is different from any other portion of said material item, said signal analyzer selecting for processing those of said process signals which do not pass through irregularities in the bodies of said material items (f) separator means spaced in a trailing direction from said irradiation zone and transversely of said pathway and responsive to each of said electronic process signals independently of any other electronic process signal to actuate said separator means to selectively discharge all of said irradiated material items having one predetermined level of radiation absorption to one location, and all of said irradiated material items having another predetermined level of radiation absorption to another location.

12. The invention according to claim 11 in which said irradiating means continuously transmits penetrating electromagnetic radiation simultaneously into any of said material items in said irradiation zone at any one time.

13. The invention according to claim 11 in which said signal analyzer means measures a plurality of radiation levels in any single material item in said irradiation zone and analyzes said plurality of radiation levels to produce a net operating value for said electronic process signals.

14. The invention according to claim 11 further comprising means for conveying a plurality of said material items having different levels of absorption of penetrating electromagnetic radiation along said pathway between said trailing portion and said leading portion.

15. The invention according to claim 14 in which said conveying means is selected from the group consisting of a conveyor belt, vibrating pan feeder, slide means, and free fall means.

16. The invention according to claim 15 in which said conveying means comprises slide means inclined downward from said trailing to said leading portion to generate gravitational movement of said material items down said slide means.

17. The invention according to claim 11 further comprising a source of said penetrating electromagnetic radiation spaced above said pathway, said source of penetrating electromagnetic radiation having a wavelength within a range of wavelengths from gamma radiation through microwave radiation.

18. The invention according to claim 11 in which each of said radiation detectors measures radiation within said irradiation zone independently of any other radiation detector in said irradiation zone.

19. The invention according to claim 11 in which said transverse spacing between said plurality of radiation detectors in which a smallest material item in said plurality of items in said pathway always passes between at least one of said detectors in which said irradiating means comprises a source of penetrating electromagnetic radiation above said pathway.

20. The invention according to claim 11 in which said signal analyzer means comprises time control means for causing each radiation detector to measure the penetrating electromagnetic radiation in a plurality of portions of each material item.

21. The invention according to claim 11 in which said separator means comprises electromechanical means to selectively discharge irradiated material items having each of said levels of radiation absorption to a correspondingly different location commensurate with the remaining amount of radiation transmitted through said material item in said irradiation zone.

22. The invention according to claim 21 in which said electromechanical means comprises a plurality of transversely spaced air valves spaced in said trailing direction from said irradiation zone and transversely of said pathway, an air source, and an air nozzle for each air valve operatively connected to a corresponding air valve, and means for actuating each of said air valves in response to said electronic process signals, the discharge from said air valves directing said material items having one predetermined level of radiation absorption away from said pathway into a predetermined location from said material items of said one predetermined level of radiation absorption.

23. The apparatus recited in claim 11 wherein said penetrating electromagnetic radiation has a wavelength resulting in transmission through said material items of between about 10% and about 90% of said penetrating electromagnetic radiation incident on the material items.

24. The apparatus recited in claim 11, where said signal analyzer means performs multiple measurements through different portions of the body of each said material item and analyzes said measurements to identify and ignore regions of irregularity within the body of each said material item, thereby using selected measurements to classify each said material item.

25. The apparatus recited in claim 14 wherein said signal analyzer means analyzes a shape of absorption of said penetrating electromagnetic radiation along said pathway between said trailing portion and said leading portion.

26. The apparatus recited in claim 20 wherein said signal analyzer time control means is programmable to adapt to said material items being sorted.

27. A method of distinguishing and separating material items having different levels of absorption of penetrating electromagnetic radiation, comprising:

(a) conveying a plurality of said material items in a random manner simultaneously and longitudinally along an elongated feed path;
(b) establishing a transverse region across said feed path irradiated by a sheet of penetrating electromagnetic radiation;
(c) irradiating said plurality of material items in said transverse region with said penetrating electromagnetic radiation;
(d) simultaneously measuring the amount of penetrating electromagnetic radiation passing through each material item in said transverse region at any instant of time as said items are continuously conveyed longitudinally through said transverse region, to generate process signals;
(e) obtaining a plurality of electromagnetic radiation penetration measurements through different portions of each of said material items;
(f) selecting from said plurality of measurements a subset of measurements having greater transmission rates than others of the plurality;
(g) clarifying each item from said subset of measurements for the item; and
(h) simultaneously analyzing said process signals to cause said process signals to actuate means for directing said items to a different destination commensurate with the amount of said penetrating electromagnetic radiation passing through each of said corresponding material items.

28. The method recited in claim 27 comprising correlating separate measurements of said subset of measurements of an item.

29. The method recited in claim 28 wherein said correlating comprises averaging said subset of measurements of an item.

* * * * *